(12) United States Patent
Jin

(10) Patent No.: US 11,679,623 B2
(45) Date of Patent: Jun. 20, 2023

(54) LEVITATING BICYCLE HUB COUPLING STRUCTURE

(71) Applicant: Yong-Gak Jin, Seoul (KR)

(72) Inventor: Yong-Gak Jin, Seoul (KR)

( * ) Notice: Subject to any disclaimer, the term of this patent is extended or adjusted under 35 U.S.C. 154(b) by 667 days.

(21) Appl. No.: 16/636,923

(22) PCT Filed: Jan. 17, 2018

(86) PCT No.: PCT/KR2018/000776
§ 371 (c)(1),
(2) Date: Feb. 6, 2020

(87) PCT Pub. No.: WO2019/066154
PCT Pub. Date: Apr. 4, 2019

(65) Prior Publication Data
US 2020/0182297 A1 Jun. 11, 2020

(30) Foreign Application Priority Data

Sep. 26, 2017 (KR) .................. 10-2017-0124126
Nov. 22, 2017 (KR) .................. 10-2017-0156238

(51) Int. Cl.
*B60B 27/02* (2006.01)
*F16C 23/10* (2006.01)
*F16C 39/06* (2006.01)
*B60B 27/00* (2006.01)

(52) U.S. Cl.
CPC ............ *B60B 27/023* (2013.01); *F16C 23/10* (2013.01); *F16C 39/066* (2013.01); *B60B 27/0005* (2013.01); *B60B 27/0078* (2013.01); *B60B 2380/22* (2013.01); *B60B 2900/1212* (2013.01);
(Continued)

(58) Field of Classification Search
CPC ............ B60B 27/023; B60B 2380/22; B60B 2900/1212; B60B 2900/911; B60B 2900/931; B60B 27/0005; B60B 27/0078; F16C 32/0402; F16C 32/0425;
(Continued)

(56) References Cited

U.S. PATENT DOCUMENTS 1,414,270 A * 4/1922 Fry .................. B60B 27/023
384/545
2011/0001379 A1* 1/2011 McCarthy ........... F16C 32/0425
310/90.5

FOREIGN PATENT DOCUMENTS

KR 10-2011-0056874 A 5/2011
KR 10-2011-0098329 A 9/2011
KR 10-1256270 B1 4/2013
(Continued)

*Primary Examiner* — Richard M Lorence
(74) *Attorney, Agent, or Firm* — KORUS Patent, LLC; Seong Il Jeong

(57) ABSTRACT

A levitating bicycle hub coupling structure using a magnet in the internal contact structure is provided. The levitating bicycle hub coupling structure in which a non-contact type structure in a levitated form is provided to reduce friction enables the position of a hub inner shaft member for transmitting the load of a user to an inner bearing part to be changed to an upper or lower preset position, and fixes the shaft member at a changed position so as to offset the load applied to the shaft member by the repulsive force of the magnets, such that the load is not applied to the bearing parts positioned at both sides of the shaft member or is significantly reduced so as to improve rolling performance, and thus riding of the bicycle becomes smoother and easier.

8 Claims, 4 Drawing Sheets

(52) U.S. Cl.
CPC ..... *B60B 2900/931* (2013.01); *F16C 2326/02* (2013.01)

(58) Field of Classification Search
CPC .... F16C 39/066; F16C 2326/02; F16C 23/10; B62K 25/02
See application file for complete search history.

(56) References Cited

FOREIGN PATENT DOCUMENTS

| | | |
|---|---|---|
| KR | 10-1378768 B1 | 3/2014 |
| KR | 10-2014-0094735 A | 7/2014 |

\* cited by examiner

LEVITATING BICYCLE HUB COUPLING STRUCTURE

TECHNICAL FIELD

The present disclosure relates to a levitating bicycle hub coupling structure in which the bicycle hub is provided with a non-contact type structure to reduce friction and prevent an eccentric load from being applied to an internal bearing part by a user's weight, to improve rolling performance so as to allow a smoother bicycle operation.

BACKGROUND ART

Bicycles have long been a means of transportation. With the gradual depletion of energy, there have been signs of another bicycle boom. Bicycles are environmentally friendly, have the advantage of not consuming energy, in addition to the effect of promoting health through exercise, which are the reasons why they have not been selected against for a long time.

Bicycles of various styles have been developed according to various uses, such as bicycles for hiking, mountain bicycles, and bicycles for racing.

In a bicycle, the hub is configured with the most precise and complex structure as a power transmission structure that performs a function of transmitting the power of the chain to the wheels. The hub assembly is mainly configured with an adapter to which a frame and a chain sprocket are mounted, and a racer and hub shaft to which this adapter is coupled, and when a load is applied to the bicycle pedal, power is transmitted to the chain sprocket by the chain, and the power is transmitted to the frame to which the wheels are provided via the adapter and the racer connected in a one-way clutch system.

However, in the conventional bicycle hub as described above, the load and impact are concentrated on the peripheral ball bearings via a shaft member fitted to the center part of the hub, and the rotational force is reduced. In addition to the problem of requiring a lot of strength to drive the bicycle due to the increase in frictional force, in the case of long-term use, there are negative effects of components wearing out due to the contacted rotation of the internal components, and causing a decrease in durability and problems in power transmission.

PRIOR ART

Patent Document

Korean Registered Utility Model No. 20-0447242 (Registered on Dec. 30, 2009)

SUMMARY OF THE INVENTION

Technical Problem

The present disclosure has been made to solve the above-mentioned problems, and the present disclosure is directed to provide a levitating bicycle hub coupling structure, wherein the bicycle hub structure uses a magnet around the periphery of a shaft member in a hub to which the eccentric load of a bicycle user is transmitted, to enable the bicycle hub to rotate in a non-contact manner, while enabling the position of the shaft member to be adjusted and then fixed so that the eccentric load transmitted to the shaft member could be maintained in a state where the repulsive force of the magnet is supported, thus improving the rolling performance of a hub compared to the convention contact type structure, which allows a smoother operation of a bicycle.

Further, the present disclosure is also directed to provide a levitating bicycle hub coupling structure, wherein the bicycle hub structure is configured to have first and second internal magnet parts formed on both sides of an outer peripheral edge of a housing which is connected to a bicycle wheel and rotates, and first and second external magnet parts having a repulsive force with respect to the first and second internal magnet parts, so that by the mutual repulsive force, an eccentric load due to the weight of a user is prevented from being transferred, and by being configured so as to adjust the degree of repulsion by variously adjusting the preset distance between these first and second internal magnet parts and first and second external magnet parts depending on the weight of the user, the rolling performance of the hub is improved as compared with the conventional contact type structure, which allows a smoother operation of a bicycle.

Other objects and advantages of the present disclosure will be described below, and will be understood by embodiments of the present disclosure. Further, the objects and advantages of the present disclosure can be realized by the means and combinations shown in the claims.

Technical Solution

As a means for solving the above problems, one mode of the present disclosure is configured to have, a shaft member 10 mounted to a bicycle hub, having both ends connected to a bicycle frame; an internal magnet part 20 fixed at an outer peripheral edge of the shaft member 10 so that the inside and outside have different magnetic poles, and is integrally formed with the shaft member 10; an external magnet part 30 provided at an outer peripheral edge of the internal magnet part 20 spaced apart therefrom so as to maintain a preset distance of a gap, and the same magnetism as the outside of the internal magnet part 20 is formed inside so that mutual friction therebetween is prevented from being generated, via the repulsive force with the internal magnet part 20, and having different magnetic poles inside and outside; a housing 40 integrally formed at the outermost periphery of the external magnet part 30 and fixed to the bicycle hub; and a bearing part 50 corresponding to both ends of the shaft member 10 and fitted to each thereof at both sides of the internal and external magnet parts 20 and 30, wherein a central mounting hole 51 is penetrated and formed so as to be elongated towards a lower side, for changing the mounting position of the shaft member 10 up and down in the mounting hole 51 and fixing the shaft member 10 to an eccentric position from the center axis to the lower end of the housing 40. When the position of the shaft member 10 is lowered and fixed to a preset position in the mounting hole 51, the width of a lower end gap G2 between the internal magnet part 20 and the external magnet part 30 is relatively narrower than the width of an upper end gap G1 and the repulsive force applied to the shaft member 10 becomes stronger, and the eccentric load of the shaft member 10 which is applied by the weight of the user and transmitted, is supported so as not to be applied to the bearing part 50, thereby not coming into contact while in a levitating state and preventing the eccentric load according to the weight of the user from being transmitted to the bearing, so that the rolling performance of the bicycle hub is improved.

Another embodiment of the present disclosure is configured to have, a shaft member 10 mounted to a bicycle hub, having both ends connected to a bicycle frame 1; a bearing part 50 corresponding to both ends of the shaft member 10 and rotatably fastened thereto; a housing 40 corresponding to and provided at the outside of the bearing part 50 in a form such that the shaft member 10 penetrates its internal center, and is connected and fixed to the bicycle hub; first and second internal magnet parts 71 and 72 formed to have a ring shape at each end of both ends of the outer peripheral edge of the housing 40 but coupled so as to have different magnetic poles on the inside and outside, and are fixed integrally with the housing 40; first and second external magnet parts 81 and 82 provided at an outer peripheral edge of each of the first and second internal magnet parts 71 and 72 spaced apart therefrom so as to maintain a preset distance D, and the same magnetism as the outside of the first and second internal magnet parts 71 and 72 is formed inside so that mutual friction therebetween is prevented from being generated, via the repulsive force with the first and second internal magnet parts 71 and 72, and having different magnetic poles inside and outside. The first and second internal magnet parts 71 and 72 and first and second external magnet parts 81 and 82 cause a repulsive force to be generated by the adjustment of the preset distance D according to the weight of the user, by which the eccentric load is not transmitted to the bearing part 50, so that the repulsive force of the first and second internal magnet parts 71 and 72 and the first and second external magnet parts 81 and 82 causes the eccentric load of the shaft member 10 transmitted from the weight of the user to be supported so as to not be applied to the bearing part 50. The first and second internal magnet parts 71 and 72 and the first and second external magnet parts 81 and 82 are mutually spaced apart and are not in contact, which prevents the eccentric load according to the weight of the user from being transmitted to the bearing, so that the rolling performance of the bicycle hub is improved.

Advantageous Effects

As described above, according to a bicycle hub of the present disclosure, it is possible to reduce the consumption of rotational energy due to the deterioration in rolling performance due to an eccentric load by making the internal contact type structure of a bicycle hub have a levitating non-contact type structure via magnets.

Furthermore, according to a bicycle hub of the present disclosure, it is possible to reduce the consumption of rotational energy due to the deterioration in rolling performance due to an eccentric load via a mutual non-contact type structure by forming magnet parts at both sides of an outer peripheral edge of a rotating housing and at a position facing such an outer peripheral edge so as to generate repulsive force therebetween.

Further, according to a bicycle hub of the present disclosure, as the shaft member to which the eccentric load due to the weight of the user is transmitted and applied is fixed while being supported by the repulsive force of the magnets, the eccentric load transmitted and applied to a peripheral bearing part conventionally is not generated, so the rolling performance is improved and it has the effect of requiring less force for the operation of the bicycle.

In addition, the present disclosure is used for the front and rear wheels of a bicycle, so that it is easy to operate the bicycle with less energy consumption, thereby enabling the same user to travel a longer distance than before.

REFERENCE NUMERALS FOR MAIN PARTS OF FIGURES

Figure 1:
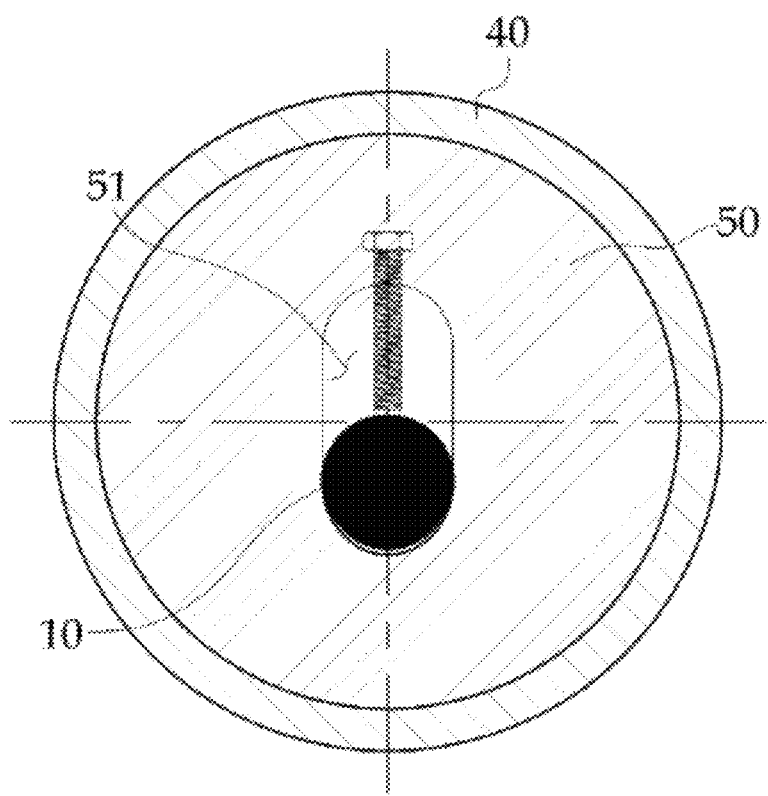
FIG. 1 is a diagram of a first embodiment illustrating a levitating bicycle hub coupling structure according to the present disclosure.

1: bicycle frame,
10: shaft member,
11: bicycle wheel
20: internal magnet part
30: external magnet part,
40: housing
50: bearing part,
51: mounting hole
60: fixing part,
61: variable fixing pin
62: fixing nut part,
71: first internal magnet part
72: second internal magnet part,
81: first external magnet part
82: second external magnet part,
90: fixing member
101: first fixing part,
102: second fixing part
G1: upper end gap, G2: lower end gap
G3: center line

DETAILED DESCRIPTION OF THE INVENTION

Before describing various embodiments of the present disclosure in detail, it is to be understood that the detailed description of the components or the arrangement of the components shown in the figures is not intended to limit the scope of the disclosure as described in the following detailed description. The disclosure may be embodied and implemented by other embodiments and may be implemented in various ways. Also, device or element direction (for example, "front", "back", "up", "down", "top", "bottom", "left," "right," "lateral," and the like, as used herein, are used merely to simplify the description of the present disclosure. It will be understood that the associated device or element does not simply indicate or imply that it must have a particular orientation, and terms such as "first" and "second" are used in the present description and the appended claims to describe the disclosure and are not limited to illustrating or meaning their relative importance or meaning.

The present disclosure has the following features to achieve the above object.

Hereinafter, preferred embodiments of the present disclosure will be described in detail with reference to the accompanying drawings. Prior to this, the terms and words used in the specification and claims should not be construed as limiting their ordinary or lexical meaning, and the meaning and concept must be interpreted according to the technical idea of the present disclosure on the basis of the principle in which the inventor may define the concept of a term as appropriate in order to describe his or her own disclosure in the best possible manner.

Therefore, the embodiment described in the present specification and the configuration shown in the drawings are merely one of the most desirable embodiments of the present disclosure, and do not represent all the technical ideas of the present disclosure. At this point, it should be understood that there are various equivalents and variations that may be substituted for these.

Looking at the first embodiment according to the present disclosure, it is configured to have a shaft member 10 mounted to a bicycle hub, having both ends connected to a bicycle frame; an internal magnet part 20 fixed at an outer peripheral edge of the shaft member 10 so that the inside and outside have different magnetic poles, and is integrally formed with the shaft member 10; an external may part 30 provided at an outer peripheral edge of the internal magnet part 20 spaced apart therefrom so as to maintain a preset distance of a gap, and the same magnetism as the outside of the internal magnet part 20 is formed inside so that mutual friction therebetween is prevented from being generated, via the repulsive force with the internal magnet part 20, and having different magnetic poles inside and outside; a housing 40 integrally formed at the outermost periphery of the external magnet part and fixed to the bicycle hub; and a bearing part 50 corresponding to both ends of the shaft member 10 and fitted to each thereof at both sides of the internal and external magnet parts 20 and 30, wherein a central mounting hole 51 is penetrated and formed so as to be elongated towards a lower side, for changing the mounting position of the shaft member 10 up and down in the mounting hole 51 and fixing the shaft member 10 to an eccentric position from the center axis to the lower end of the housing 40. When the position of the shaft member 10 is lowered and fixed to a preset position in the mounting hole 51, the width of a lower end gap G2 between the internal magnet part 20 and the external magnet part 30 is relatively narrower than the width of an upper end gap G1 and the repulsive force applied to the shaft member 10 becomes stronger, and the eccentric load of the shaft member 10 which is applied by the weight of the user and transmitted, is supported so as not to be applied to the bearing part 50, thereby not coming into contact while in a levitating state and preventing the eccentric load according to the weight of the user from being transmitted to the bearing, so that the rolling performance of the bicycle hub is improved.

Further, the bearing part 50 is characterized in that it includes a fixing part 60 formed integrally and protruding outside the bearing part 50; a variable fixing pin 61 for fixing the shaft member 10 so as not to be raised upward by a repulsive force while being in contact with the outer peripheral edge of the shaft member 10 disposed at a preset position in the mounting hole 51; and a fixing nut part 62 for preventing the bearing part 50 from being detached outside by being fixed and provided on the outer periphery of the fixing part 60.

Further, the bearing part 50 is characterized in that an eccentric bearing is used in a ball bearing and a cartridge bearing.

Further, the internal magnet part 20 or the external magnet part 30 is characterized in that it is any one of a single integrated magnet, a split magnet in which a plurality of magnets are assembled, a ring-shaped magnets and a C-shaped magnet.

Further, looking at the second embodiment of the present disclosure, it is configured to have a shaft member 10 mounted to a bicycle hub, having both ends connected to a bicycle frame 1; a bearing part 50 corresponding to both ends of the shaft member 10 and rotatably fastened thereto; a housing 40 corresponding to and provided at the outside of the bearing part 50 in a form such that the shaft member 10 penetrates its internal center, and is connected and fixed to the bicycle hub; first and second internal magnet parts 71 and 72 formed to have a ring shape at each end of both ends of the outer peripheral edge of the housing 40 but coupled so as to have different magnetic poles on the inside and outside, and are fixed integrally with the housing 40; first and second external magnet parts 81 and 82 provided at an outer peripheral edge of each of the first and second internal magnet parts 71 and 72 spaced apart therefrom so as to maintain a preset distance P and the same magnetism as the outside of the first and second internal magnet parts 71 and 72 is formed inside so that mutual friction therebetween is prevented from being generated, via the repulsive force with the first and second internal magnet parts 71 and 72, and having different magnetic poles inside and outside. The first and second internal magnet parts 71 and 72 and first and second external magnet parts 81 and 82 cause a repulsive force to be generated by the adjustment of the preset distance D according to the weight of the user, by which the eccentric load is not transmitted to the bearing part 50, so that the repulsive force of the first and second internal magnet parts 71 and 72 and the first and second external magnet parts 81 and 82 causes the eccentric load of the shaft member 10 transmitted from the weight of the user to be supported so as to not be applied to the bearing part 50. The first and second internal magnet parts 71 and 72 and the first and second external magnet parts 81 and 82 are mutually spaced apart and are not in contact, which prevents the eccentric load according to the weight of the user from being transmitted to the bearing, so that the rolling performance of the bicycle hub is improved.

Further, the first and second external magnet parts 81 and 82 are provided so as to be extended inwardly of the bicycle frame 1, and by adjusting the fixing position of the fixing member 90 for fixing the first and second external magnet parts 81 and 82 to the bicycle to a position in the upper, lower direction, the preset distance D between the first and second internal magnet parts 71 and 72 is adjusted.

Further, the first and second external magnet parts 81 and 82 are characterized in that they are provided as a semicircle or an arc cross-sectional shape smaller than the semicircle so as to correspond only to the upper part of the outer peripheral edge of the first and second internal magnet parts 71 and 72.

Further, the first and second internal magnet parts 71 and 72 or the first and second external magnet parts 81 and 82 are characterized in that they are any one of a single integrated magnet or a split magnet in which a plurality of magnets are assembled.

Figure 2:
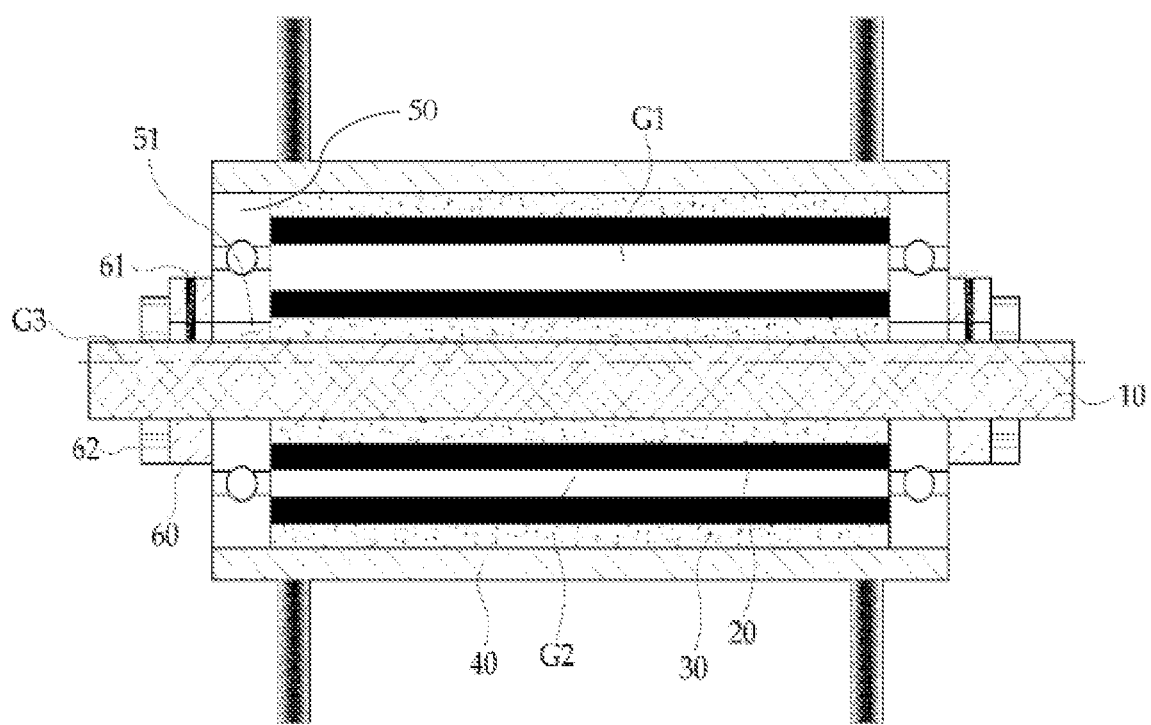
FIG. 2 is another view of the first embodiment of the present disclosure illustrating a levitating bicycle hub coupling structure.
Figure 3:
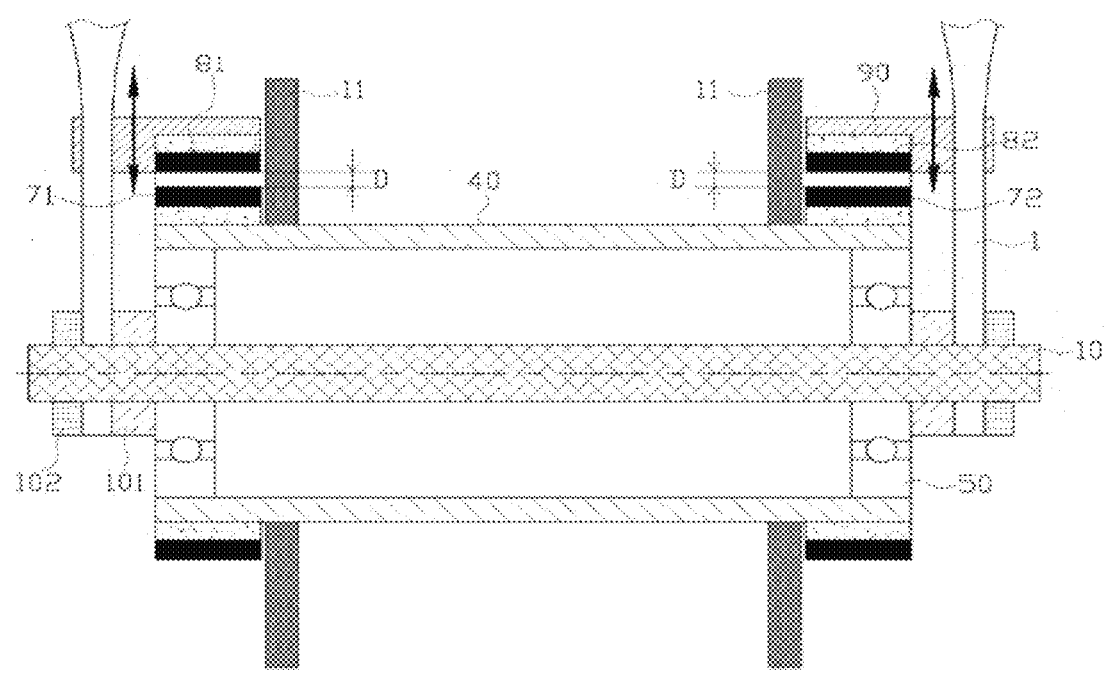
FIG. 3 is a view of a second embodiment of the present disclosure illustrating a levitating exterior type bicycle hub coupling structure according to the present disclosure.
Figure 4:
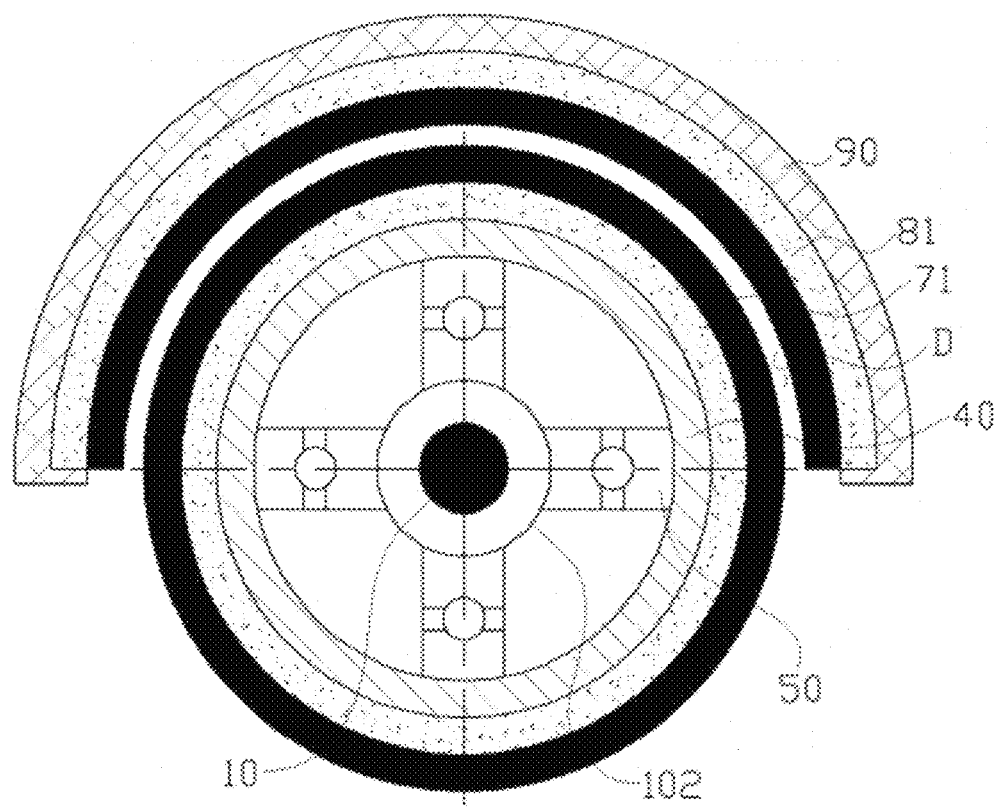
FIG. 4 is a side view of FIG. 3.

Hereinafter, a levitating bicycle hub connecting structure according to a preferred embodiment of the present disclosure 11 be described in detail with reference to FIGS. 1 to 4.

A first embodiment of a levitating bicycle hub coupling structure according to the present disclosure includes a shaft member 10, an internal magnet part 20, an external magnet part 30, a bearing part 50, and a housing 40.

In general, the bicycle hub is the central part where the spokes of the bicycle wheel are gathered and can be configured to rotate with the wheel about the internal shaft member 10, and according to various embodiments of the user, can be configured separately from or occupying a part of the wheel, and can also be configured to allow rotation of the bicycle wheel from the bicycle frame.

The shaft member 10 is a shaft having a circular cross-section that is fitted to the center of the bicycle hub, and a bicycle frame is connected to both ends that are generally protruded, and is fixed so as not to rotate. The shaft member 10 is the part where not only the weight of the e body but also the load according to the weight of the user is transmitted thereto when a user sits on a bicycle saddle and rides on the bicycle.

The internal magnet part 20 is formed integrally around the outer peripheral edge of the shaft member 10 described above, and inner peripheral edge and an outer peripheral edge of the internal magnet part 20 have different magnetisms.

For example, in the present disclosure, the inner peripheral edge part has an "S" polar magnetism and the outer peripheral edge part has an "N" pole magnetism. Such an internal magnet part 20 has an empty ring-shaped cross-section through which the inside is penetrated.

The external magnet part 30 is rotatably arranged around the outer peripheral edge of the above-described internal magnet part 20, and similarly to the internal magnet part 20, has an empty elongated cross-section through which the inside is penetrated.

Although such an external magnet part 30 has an inner peripheral edge and an outer peripheral edge having different magnetisms, repulsive force generated with the "N" pole magnetism on the outer peripheral edge side of the internal magnet part 20, and a gap is formed on the surfaces facing each other. The inner periphery has an "N" polarity and the outer periphery has an "S" polarity so that it can be maintained.

As a result, the internal magnet part 20 and the external magnet part 30 have a mutual double tube shape and have a structure in which they are spaced apart from each other without being in close mutual contact.

In other words, when the user of the bicycle sits on the saddle, the load is transmitted to both ends of the shaft member 10 connected to the bicycle frame, where the internal magnet part 20 is formed on the outer peripheral edge, and at the outside of such a shaft member 10, positioned is the external magnet part 30 that rotates by the transmission of the rotational force of the wheel of the bicycle, so the shaft member 10 is not in close contact with inner peripheral edge of the external magnet part 30 by the repulsive force inside the external magnet part 30, and the entire outer peripheral edge is separated from the inner peripheral edge of the external magnet part 30 to form a gap, and floats in a non-contact type structure in a levitated form.

In this manner, the consumption of rotational energy can be minimized because there is no contact friction, as compared with a bicycle hub which conventionally has a contact type structure without using a magnet.

Further, the internal magnet part 20 or the external magnet part 30 described above may be used in various forms according to the embodiment of the user. However, any one of a single integrated magnet, a split magnet in which a plurality or magnets are assembled, ring-shaped magnet, and a C-shaped magnet may be used.

The housing 40 is integrally formed outside the above-described external magnet part 30 and is a part that is rotated by being connected to a bicycle wheel or the like together with the external magnet part 30.

The housing 40 has a length relatively longer than the external magnet part 30 and has a structure in which both sides of the external magnet part 30 are extended and formed to have a predetermined length.

The hearing part 50 fitted to both sides of the internal and external magnet parts 20 and 30 so as correspond to both ends of the shaft member 10, for the smooth rotation of the housing 40 and the external magnet part 30 around the shaft member 10.

In the present disclosure, such a bearing part 50 is penetrated to have a mounting hole 51 formed at the center, but such a mounting hole 51 is formed to be longer from the center to the lower end. In the present disclosure, a variable eccentric bearing may be used as such a bearing part 50.

This is to enable the position of the shaft member 10 to be changed and fixed in various ways according to various embodiments of the user, and to enable the shaft member 10 to be moved vertically up and down in the mounting hole 51 and then fixed after the mounting position is changed.

In the case where the shaft member 10 is located at the uppermost end in the mounting hole 51 and forms the same central axis as the center of the housing 40, the upper end gap G1 and the lower end gap of the internal magnet part 20 and the external magnet part 30 are initially the same, but eventually, when the shaft member 10 lowered in the mounting hole 51 and the position changed and fixed to a preset position, the width of the lower end gap G2 be relatively narrower than the width of the upper end gap G1 and the repulsive force applied to the shaft member 10 becomes stronger.

This supports the eccentric load of the shaft member 10 conventionally transmitted by application of the weight of a user, and in the conventional case where such a repulsive force using the magnet member and the magnet members is not applied, the entire load is applied to the bearing part 50, which can cause noise and be an obstacle to smooth rotation. However, in the present disclosure, as the shaft member 10 is moved from the center to the lower end of the housing 40, the shaft member 10 is made to be fixed penetrated at a position eccentric from the center axis to a lower end of the housing 40, and the repulsive force of the lower end gap G2 is further strengthened by the size of the narrowed lower end gap. Such a repulsive force and supports the shaft member 10 so that the eccentric load is not applied to the bearing part 50, thereby the eccentric load due to the weight of the user prevented from being transmitted to the bearing part 50 while the shaft member 10 is in a non-contact levitating form, so that the rolling performance of bicycle hub is improved.

Such improved rolling performance has the effect that less force is required by the user during the operation of the bicycle, and, as a result, the operation of the bicycle becomes easier while it becomes possible to operate a longer distance than the conventional, using the same force.

Further, in order to fix the shaft member 10 whose position has been adjusted, such a bearing part 50 further includes a fixing part 60, a variable fixing pin 61, and a fixing nut part 62 on outer surface of each of the bearing part on both sides of the shaft member 10.

The fixing part 60 is integrally formed so as protrude outside the bearing part 50, but has a shape which the center is penetrated, and is formed so as to have a pin hole penetrated perpendicularly at an upper end part up to the center hole such that a variable fixing pin 61 to be described later corresponds thereto and is fitted to be movable up and down.

The variable fixing pin 61 is provided penetrating upright so as to be able to be inserted and discharged from the outside to the inside of the fixing part 60, and serves to come into contact with an outer peripheral edge of the shaft member 10 arranged at a preset position in the mounting hole 51 of the bearing part 50 while fixing the shaft member 10 so that the shaft member 10 does not rise upward due to repulsive force. That is, the variable fixing pin 61 has a male screw part formed on the outer peripheral edge thereof, and a female screw part is formed in the pinhole of the fixing part 60, to enable such a variable fixing pin 61 to be raised and lowered, and various ways as such may be used.

The fixing nut part 62 serves to prevent the bearing part 50 from being detached from the outside by being fixed to the outer periphery of the fixing part 60 by being fitted to the shaft member 10.

A second embodiment of the levitating bicycle hub connection structure (exterior type) according to the present disclosure includes a shaft member 10, a bearing part 50, a housing 40, first and second internal magnet parts 71 and 72, and first and second external magnet parts 81 and 82.

In general, the bicycle hub is a central part where the spokes of the bicycle wheel 11 are gathered and can be configured to rotate with the bicycle wheel 11 about the internal shaft member 10, and according to various embodiments of the user, can be configured separately from or occupying a part of the wheel 11, and can also be configured to allow rotation of the bicycle wheel 11 from the bicycle frame (seat, stay, fork, 10).

The shaft member 10 is a shaft having a circular cross-section that is fitted to the center of the bicycle hub, and a bicycle frame is connected to both ends that are generally protruded, and is fixed so as not to rotate. The shaft member 10 is the part where not only the weight of the bicycle body but also the load according to the weight of the user is transmitted thereto when a user sits on a bicycle saddle and rides on the bicycle.

The bearing part 50 is for smooth rotation of the housing 40 described later, and is rotatably fastened to the outer peripheral edge of both ends of the shaft member 10 in a ring shape.

To this end, it should be understood that the bearing part 50 must have a mounting hole penetrated and formed in the center, and such a bearing part 50 may be a ball bearing and such various bearings may be used according to various embodiments of a user.

The housing 40 is a cylindrical tube surrounding the outer peripheral edge of the bearing part 50 after the bearing part 50 is fitted to the outer peripheral edge on both sides of the shaft member 10 described above. Such a housing 40 is a part that is rotated by being connected to the bicycle wheel 11 or the like.

The first and second internal magnet parts 71 and 72 are magnets formed in a ring shape so as to form an exterior around both outer peripheral edges of the housing 40 described above. In the embodiment, the first internal magnet part 71 is formed at the left end part of the housing 40 and the second internal magnet part 72 is formed at the outer peripheral edge of the right end part of the housing 40.

Further, such first and second internal magnet parts 71 and 72 are integrally formed with the housing 40 and rotate together with the housing 40 and the inner peripheral edges and outer peripheral edges of each of the first and second internal magnet parts 71 and 72 are made to have different magnetism.

For example, in the present disclosure, the inner peripheral edge part has an "S" polar magnetism and the outer peripheral edge part has an "N" pole magnetism. Such first and second internal magnet parts 71 and 72 have an empty ring-shaped cross-section through which the inside is penetrated.

The first and second external magnet parts 81 and 82 are arranged in an external form corresponding to the outer peripheral edges of the first and second internal magnet parts 71 and 72, and are provided at the end part of a fixing member 90 formed extending horizontally towards the inside the bicycle frame 1 to be positioned to be facing the first and second external magnets 81 and 82.

Such first and second external magnets 81 and 82 each are made so that the inner peripheral edge and outer peripheral edge thereof have mutually different magnetism, but are made so that the inner peripheral edge part has an "N" polar magnetism and the outer peripheral edge part has an "S" polar magnetism. (Of course, as long as a repulsive force is generated between the first and second internal magnet parts 71 and 72 and the first and second external magnet parts 81 and 82, it is only necessary that the surfaces facing each other have the same polarity as the N pole or S pole).

For example, in the present disclosure, the inner peripheral edge part has an "S" polar magnetism and the outer peripheral edge part has an "N" pole magnetism. Such first and second internal magnet parts 71 and 72 have an empty ring-shaped cross-section through which the inside is penetrated.

That is, at the outer peripheral edge of the bicycle frame 1 to which one end is connected to the shaft member 10 and transmits the eccentric load when the user rides on the bicycle, the fixing member 90 is a structure formed to be protruding toward each of the first and second internal magnet parts 71 and 72. As a result, by adjusting the fixing position of the fixing member 90 for fixing the first and second external magnet parts 81 and 82 in the up and down longitudinal direction of the bicycle frame 1, the preset distance D of the first and second internal magnet parts 71 and 72 and therebetween is adjusted. Of course, the part connected to the bicycle frame 1 by the fixing member 90 can be attached to and detached from the bicycle frame 1, but once a position is determined, various configurations, such as a clamp structure or a bolt/nut coupling structure, can be configured to fix the position without being detached, according the embodiments of a user.

Therefore, the first and second internal magnet parts 71 and 72 and the first and second external magnet parts 81 and 82 can adjust the preset distance D according to the weight of the user, and can be adjusted for each user. What is necessary is just to adjust the above-mentioned preset distance D so that the repulsive force is generated such that the eccentric load is not transmitted to the bearing part 50 according to the different weights. In this way, due to the repulsive force of the first and second internal magnet parts 71 and 72 and the first and second external magnet parts 81 and 82, the eccentric load of the shaft member 10 applied by user to be transmitted is supported so it the weight of the is not applied to the bearing part 50, and the first and second internal magnet parts 71 and 72 and the first and second external magnet parts 81 and 82 are spaced apart in a mutual non-contact levitating form, so the eccentric load according to tale weight of the user is not transmitted to the bearing, and thus the rolling performance of the bicycle hub is improved.

Such improved rolling performance has the effect that less force is required by the user during the operation of the and, as a result, the operation of the bicycle becomes easier while it becomes possible to operate a longer distance than the conventional, using the same force.

Further, since the first external magnet part 81 and the second external magnet part 82 support the eccentric load transmitted to the lower side through the bicycle frame 1 by repulsive force, the first external magnet part 81 and the second external magnet part 82 can be formed to have a semicircular "∩" shape or an arc cross-section smaller than the semicircle so as to correspond only to the outer peripheral edge on the upper side of the first and second internal magnet parts 71 and 72.

Further, of course, the first and second internal magnet parts 71 and 72 (ring shape) or the first and second external magnet parts 81 and 82 (arc shape) mentioned above can be produced with any one of a single integrated magnet, a split magnet in which a plurality of magnets are assembled, a ring-shaped magnet, and a C-shaped magnet single piece according to various embodiments of the user. [107] [108] [109] Further, the front end and the rear end of the bicycle frame 1 where the bicycle frame 1 is coupled to the shaft member 10 may be provided with a first fixing part 101 and a second fixing part 102 for the purpose of the outer deviation of the bearing part 50 and the fixing of the bicycle frame 1, the first fixing part 101 and the second fixing part 102 may be removably coupled to the shaft member 10 by via various means such as washers, nuts, or the like.

As described above, the present disclosure has been described with reference to the limited embodiments and the drawings. However, the present disclosure is not limited to these, and the present disclosure is not limited thereto. Of course, various modifications and changes are possible within the scope of the technical idea and the scope of the claims set forth below.

The invention claimed is:

1. A levitating bicycle hub coupling structure comprising:
a shaft member having both ends connected to a bicycle frame;
an internal magnet part fixed to an outer periphery of the shaft member so that inside and outside of the internal magnet part have different magnetic poles each other;
an external magnet part spaced apart from an outer periphery of the internal magnet part so as to maintain a preset distance of a gap, wherein inside and outside of the external magnet part have different magnetic poles each other and the inside of the external magnet part has a same polarity as the outside of the internal magnet part so that mutual friction therebetween is prevented from being generated, via a repulsive force with the internal magnet part;
a housing provided on an outer periphery of the external magnet part and rotatably mounted on the shaft member; and
a first bearing part disposed at one end of the shaft member and a second bearing part disposed at an opposite end of the shaft member, the first and second bearing parts being fitted at opposite sides of the internal and external magnet parts, respectively,
wherein a central mounting hole is penetrated and formed in the first and second bearing parts so as to be elongated towards a lower side, for changing a mounting position of the shaft member up and down in the mounting hole and fixing the shaft member to an eccentric position from a center axis of the housing to a lower end of the housing, wherein when the position of the shaft member is lowered and fixed to a preset position in the mounting hole, the width of a lower end gap between the internal magnet part and the external magnet part is relatively narrower than the width of an upper end gap and the repulsive force applied to the shaft member in the lower end gap becomes stronger than in the upper end gap, and an eccentric load of the shaft member which is applied by a weight of a user and transmitted, is supported so as not to be applied to the bearing parts, thereby not making the shaft member come into contact with the bearing parts while in a levitating state and preventing the eccentric load according to the weight of the user from being transmitted to the bearing parts, so that rolling performance of a bicycle hub is improved.

2. The levitating bicycle hub coupling structure of claim 1, characterized in that the bearing part comprises a fixing part; a variable fixing pin for fixing the shaft member by being inserted through the fixing part so as not to be raised upward by a repulsive force while being in contact with the outer periphery of the shaft member disposed at a preset position in the mounting hole; and a fixing nut part for preventing the bearing part from being detached outside by being fixed and provided on an outer side of the fixing part.

3. The levitating bicycle hub coupling structure of claim 1, wherein the bearing parts are characterized in that an eccentric bearing is used in a ball bearing or a cartridge bearing.

4. The levitating bicycle hub coupling structure of claim 1, characterized in that the internal magnet part or the external magnet part is any one of a single integrated magnet, a split magnet in which a plurality of magnets are assembled, a ring-shaped magnet, and a C-shaped magnet.

5. A levitating bicycle hub coupling structure comprising,
a shaft member having both ends connected to a bicycle frame 1;
a first bearing part disposed at one end of the shaft member and a second bearing part disposed at an opposite end of the shaft member, inner races of the first and second bearing parts being rotatably fastened to the shaft member;
a housing corresponding to and provided at outsides of the bearing parts in a form such that the shaft member penetrates an internal center of the housing;
first and second internal magnet parts formed to have a ring shape at each end of both ends of the outer periphery of the housing but coupled so as to have different magnetic poles on inside and outside; and
first and second external magnet parts spaced apart from an outer periphery of each of the first and second internal magnet parts by a preset distance, wherein inside and outside of the first and second external magnet parts have different magnetic poles and the inside of the first and second external magnet parts has a same polarity as the outside of the first and second internal magnet parts so that mutual friction therebetween is prevented from being generated, via a repulsive force with the first and second internal magnet parts, characterized in that the first and second internal magnet parts and first and second external magnet parts cause a repulsive force to be generated by an adjustment of the preset distance according to a weight of a user, by which an eccentric load is not transmitted to the bearing part, so that the repulsive force of the first and second internal magnet parts and the first and second external magnet parts causes the eccentric load of the shaft member transmitted from the weight of the user to be supported so as to not be applied to the bearing part, wherein, by adjusting a fixing position of a fixing member for fixing the first and second external magnet parts to the bicycle to a position in the upper and lower directions the preset distance is adjusted, wherein the first and second internal magnet parts and the first and second external magnet parts are mutually spaced apart and are not in contact, which prevents the eccentric load according to the weight of the user from being transmitted to the bearing parts, so that rolling performance of a bicycle hub is improved.

6. The levitating bicycle hub coupling structure of claim 5, characterized in that the first and second external magnet parts are provided so as to be extended inwardly of the bicycle frame.

7. The levitating bicycle hub coupling structure of claim 5, characterized in that the first and second external magnet parts are provided as a semicircle or an arc cross-sectional shape smaller than the semicircle so as to correspond only to the upper part of the outer periphery of the first and second internal magnet parts.

8. The levitating bicycle hub coupling structure of claim 5, characterized in that the first and second internal magnet parts or the first and second external magnet parts are any one of a single integrated magnet or a split magnet in which a plurality of magnets are assembled.

\* \* \* \* \*